SYMMETRICAL VOLTAGE LIMITING DEVICE APPARATUS

Filed May 17, 1967

INVENTOR.
ADRIAN J. MOSES

BY Bruce C Lutz

ATTORNEY

United States Patent Office 3,508,140
Patented Apr. 21, 1970

3,508,140

SYMMETRICAL VOLTAGE LIMITING DEVICE APPARATUS

Adrian J. Moses, Rush City, Minn., assignor to Honeywell Inc., Minneapolis, Minn., a corporation of Delaware Filed May 17, 1967, Ser. No. 639,093
Int. Cl. G05f *3/04;* H02m *5/12*
U.S. Cl. 323—81 2 Claims

ABSTRACT OF THE DISCLOSURE

A simple limiter circuit which provides symmetrical limiting of an AC voltage. A capacitor connected in series with a Zener diode becomes charged to provide a bias voltage for the diode which causes the series combination to have a symmetrical limiting characteristic.

Background

This invention relates to the field of signal conditioning circuitry and more particularly to voltage limiting circuitry to symmetrically limit AC signals.

There are many known circuits which limit the amplitude of a voltage level. In order to symmetrically limit an AC signal voltage it has normally been necessary to use one set of circuit elements to limit the positive voltage excursions and a different set of elements to limit negative voltage excursions. This has been found to be undesirable due to weight limitations imposed in most modern aerospace systems.

Circuits employing a single double-anode Zener diode may be used to symmetrically limit AC signals. However, the voltage breakdown characteristics do not have a sharp knee unless Zener breakdown voltage values of greater than 7 volts are used. Thus a double-anode Zener diode limiter would be effectively restricted to operating with limits greater than 14 volts peak-to-peak.

The present invention was developed to meet the need for a voltage limiter circuit with a minimum of parts which would operate to provide symmetrical limiting for AC signals.

The invention requires only two parts in addition to the parts normally present in a typical amplifier without limiters. The invention also provides superior performance over the double-anode Zener diode limiter, especially for low voltage limiting values.

Description

The symmetrical voltage limiter circuit operates by limiting a voltage of one polarity with the reverse voltage breakdown characteristics of a Zener diode and limiting a voltage of the opposite polarity by the normal diode characteristics biased by the steady state voltage present on a capacitor in series with the Zener diode. The voltage across the capacitor is developed because of the initial unsymmetrical limiting action of the Zener diode.

One of the advantages of the invention is its simplicity and relative lack of parts. The use of a single semi-conductor to provide limiting for positive and negative polarity signals presents a considerable weight and reliability advantage. The present invention is also superior to voltage limiters employing a double-anode Zener diode in that it provides a peak-to-peak limiting voltage equal to the value of the Zener diode plus a normal diode drop while the peak-to-peak limiting value for a double-anode Zener diode limiter is equal to twice the Zener voltage of the individual Zener junctions. Thus a Zener diode with a large breakdown voltage and desirable knee characteristic may be used in the present invention to obtain the same limiting value obtained in the double-anode Zener diode limiter with the diodes therein having smaller breakdown voltages and less desirable knee characteristics.

Thus it is an object of this invention to provide a simple limiter circuit.

It is a further object of this invention to provide a symmetrical voltage limiter circuit having a minimum of parts.

It is a still further object of this invention to provide a symmetrical voltage limiter circuit employing a single conventional Zener diode.

Further objects and advantages will become apparent from a reading of the specification and claims in conjunction with the drawings wherein:

Figure 1:
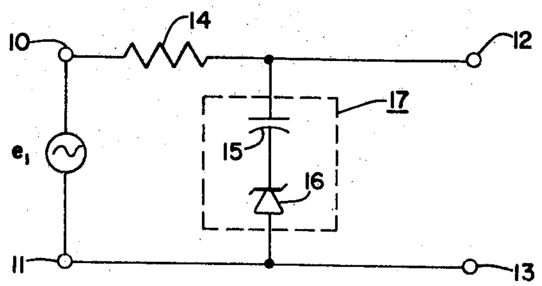
FIGURE 1 is a schematic drawing of the limiter circuit.

In FIGURE 1 the input terminals are denoted by reference numerals 10 and 11 and the output terminals by reference numerals 12 and 13. Input terminal 10 is connected to output terminal 12 through a resistance 14 and input terminal 11 is connected directly to output terminal 13 to form a common reference or source of reference potential. The output terminals 12 and 13 are shunted by shunt element 17 which is comprised of a series connection of direct current blocking means or capacitor 15 and a voltage breakdown means or Zener diode 16.

Figure 2:
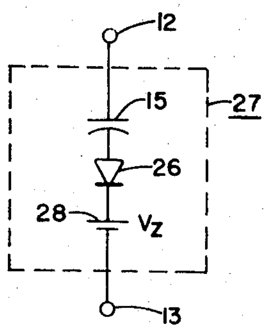
FIGURE 2 is a schematic representation of the shunt portion of the limiter as it initially appears to positive polarity signals.

In FIGURE 2 the shunt element 17 of FIGURE 1 is replaced by an equivalent shunt circuit 27 for positive polarity input signals before steady state operating conditions have been established. Shunt element 27 is comprised of a series connection of an initially uncharged capacitor 15, an ideal diode 26, and a first voltage source 28. An ideal diode is a model of a diode having zero resistance and no voltage drop in the forward direction and an infinite resistance in the reverse direction. Zener diode 16 may be modeled by the combination of an ideal diode 26 and a first voltage source 28 whose magnitude is equal to the Zener diode voltage $V_z$ of Zener diode 16. The negative terminal of first voltage source 28 is connected to output terminal 13 and a positive terminal is connected to the cathode of ideal diode 26. Capacitor 15 has one terminal connected to the anode of ideal diode 26 and the other terminal to output terminal 12.

Figure 3:
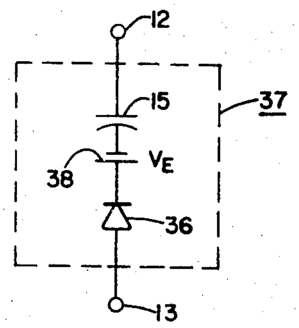
FIGURE 3 is a schematic representation of the shunt portion of the limiter as it initially appears to negative polarity signals.

In FIGURE 3 the shunt element 17 of FIGURE 1 is replaced by an equivalent shunt circuit 37 for negative polarity input signals before steady state operating conditions have been reached. Shunt element 37 is comprised of an initially uncharged capacitor 15 with one terminal connected to output terminal 12 and the other terminal connected to the negative terminal of a second voltage source 37. The positive terminal of second voltage source 37 is connected to the cathode of ideal diode 36. The anode of ideal diode 36 is connected to output terminal 13. Zener diode 16 with a negative voltage applied to the cathode may be modeled by an ideal diode 36 back-biased by a voltage source 38 which has a magnitude equal to the normal forward-biased voltage drop $V_E$ of Zener diode 16.

Figure 4:
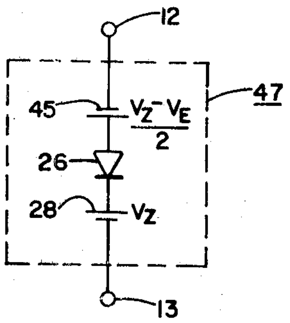
FIGURE 4 is a schematic representation of the shunt portion of the limiter as it appears to positive polarity signals after steady state operating conditions have been attained.

In FIGURE 4 the shunt element 27 of FIGURE 3 may be replaced by an equivalent shunt element 47 when steady state conditions are reached. Capacitor 15 has been charged to a steady state voltage and exhibits negligible change in charge during each half cycle interval of the input wave, therefore capacitor 15 may be shown as a voltage source 45 whose magnitude will later be shown to be equal to one half of the difference between the magnitude of the Zener breakdown voltage $V_Z$ and the normal breakdown voltage $V_E$. The voltage source 45 has its negative terminal connected to output terminal 12 and its positive terminal connected to the anode of ideal diode 26. The second voltage source 28 has its positive terminal connected to the cathode of ideal diode 26 and its negative terminal to output terminal 13.

Figure 5:
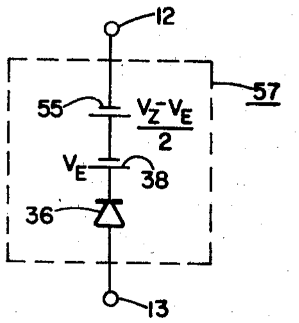
FIGURE 5 is a schematic representation of the shunt portion of the limiter as it appears to negative polarity signals after steady state operating conditions have been attained.

In FIGURE 5 the shunt element 37 of FIGURE 3 may be replaced by an equivalent shunt element 57 when steady state conditions are reached. As in shunt element 47 of FIGURE 4 the capacitor 15 has been replaced by a voltage source 55 whose voltage is equal to one half the difference between the Zener breakdown voltage $V_Z$ and the normal breakdown voltage $V_E$. The negative terminal of voltage source 55 is connected to output terminal 12 and the positive terminal is connected to the negative terminal of second voltage source 38. The cathode of ideal diode 36 is connected to the positive terminal of second voltage source 38 and the anode is connected to output terminal 13.

Operation

For the purposes of this explanation a positive input is defined as an input which forces input terminal 10 to be more positive than input terminal 11. When an input $e_1$, is initially applied to the system, the capacitor 15 appears to be a short circuit. If the first half cycle of the input wave form is a large positive voltage the Zener diode breakdown voltage of diode 16 will be exceeded and the current will flow therethrough. Another representation of the operation is shown in FIGURE 2 wherein the Zener diode 16 is represented as the series combination of ideal diode 26 and first voltage source 28. Current may be forced between terminals 12 and 13 when the voltage between terminals 12 and 13 exceeds the voltage of the first voltage source 28 and ideal diode 26 is forward-biased. This current will attempt to charge capacitor 15 such that the electrode connected to the output 12 is positive with respect to the other electrode. The voltage applied to charge capacitor 15 in this direction will be the voltage across terminals 12 and 13 minus the Zener diode breakdown voltage of diode 16 which is the magnitude of the voltage source 28.

When the input wave form becomes negative, diode 16 will conduct in the forward direction such that essentially all of the applied voltage is applied to charge capacitor 15. This is indicated in FIGURE 3 wherein the Zener diode 16 has been replaced by a combination of ideal diode 36 and a second voltage source 38. Ideal diode 36 becomes forward-biased and capacitor 15 begins to charge as soon as the voltage across terminals 12 and 13 is more negative than the voltage of the second voltage source 38 which is equal to the forward-biased diode off set of the Zener diode 16. Thus, capacitor 15 will be discharged from its previously charged potential and will start charging in the opposite direction at a much faster rate than previously because there is a larger applied voltage thereacross. The applied voltage charging in the negative direction is larger because the forward voltage drop $E_E$ of diode 16 is much less than the Zener voltage $V_Z$.

Because the capacitor 15 is charged more rapidly during the negative half cycle, an equilibrium condition will result wherein the capacitor 15 will accumulate a charge giving rise to a net voltage across capacitor 15 which is negative when measured between the electrode connected to output terminal 12 and the electrode connected to the cathode of Zener diode 16. If the input wave form is symmetrical, it can be shown that the steady state voltage across capacitor 15 is equal to one half of the difference between the Zener diode breakdown voltage and the forward-biased Zener diode off set. For the steady state the capacitor 15 may be replaced by voltage source 45 in FIGURE 4 or voltage source 55 in FIGURE 5 which are the equivalent circuits for positive and negative inputs respectively.

For the purposes of explanation it may be assumed that the Zener diode 16 has a Zener breakdown voltage of 10.6 volts and a forward-biased voltage drop of 0.6 volt. Therefore the capacitor 15 may be replaced by an equivalent voltage source 45 or 55 whose magnitude is equal to 5 volts. If the positive half cycle of the applied wave form is in excess of the arithmetic sum of the voltage of voltage source 45 plus voltage source 28 or in this example 5.6 volts, ideal diode 26 will be forward-biased and will act as a short circuit current shunt for voltages between input terminals 12 and 13 in excess of 5.6 volts. For negative input wave-forms the equivalent shunt circuit 57 of FIGURE 5 applies. The magnitude of equivalent voltage source 55 is equal to 10 volts and the magnitude of voltage source 38 is equal to .6 volt, therefore ideal diode 36 will be forward-biased for output voltages between terminals 12 and 13 in excess of negative 5.6 volts. Therefore the circuit operates to provide a symmetrically limited output wave form which has a peak-to-peak value equal to the sum of the reversed biasing voltage applied to ideal diode 26 of shunt element 47 in FIGURE 4 plus the reverse biasing voltage applied to ideal diode 36 of equivalent shunt element 57 of FIGURE 5. The peak-to-peak limiting value may also be represented as the sum of the Zener diode breakdown voltage of diode 16 plus the forward-biasing diode drop of Zener diode 16.

An advantage of the present invention lies in the fact that for equivalent peak-to-peak limiting values the present invention allows the selection of a Zener diode whose breakdown voltage is nearly two times greater than that used in a similar prior circuit. It is known in the art that the voltage breakdown characteristics of Zener diodes become more satisfactory for breakdown voltages in excess of 7 volts. Thus the disclosed circuit in addition to providing a limiter wherein a single Zener diode provides the limiting action also provides more desirable performance for smaller peak-to-peak limiting values. Since a single Zener diode is used there is no problem introduced by temperature variations between two Zener diodes.

The circuit may be alternately configured inverting shunt element 17 to obtain the same steady state limiting action.

I claim:

1. A limiting circuit comprising:
input means for accepting an AC signal to be limited;
a reference potential means;
a capacitor;
a Zener diode;
output means;
a resistor connecting said input means to said output means and to said capacitor; and
means connecting said Zener diode means to said reference potential means and to said capacitor, whereby bilateral limiting is achieved on an input signal.

2. The limiting circuit in claim 1 wherein the magnitude of the resistor and capacitor are so related to the frequency of the AC signal that the capacitor for steady state conditions may be replaced by a voltage source having a magnitude approximately equal to one-half of the difference between the Zener diode breakdown voltage and the forward voltage drop of the Zener diode.

References Cited

UNITED STATES PATENTS

| | | | |
|---|---|---|---|
| 3,023,355 | 2/1962 | Thorsen | 323—81 X |
| 3,166,276 | 1/1965 | Goerner et al. | 307—318 X |
| 3,102,228 | 8/1963 | Werth | 323—81 X |
| 3,173,029 | 3/1965 | Nadolsky | 323—81 X |
| 3,064,143 | 11/1962 | Sanderson | 307—237 |
| 3,196,289 | 7/1965 | Heizer | 307—237 |
| 3,321,642 | 5/1967 | Peterson | 307—237 |

LEE T. HIX, Primary Examiner

G. GOLDBERG, Assistant Examiner

U.S. Cl. X.R.

307—237, 318